United States Patent [19]

Hull et al.

[11] 3,986,749
[45] Oct. 19, 1976

[54] TRUCK BODY COVER EMPLOYING ACCESSIBLE ROLLER BRACKET ASSEMBLY

[76] Inventors: Virginia J. Hull; Darwin L. Hull, both of 1611 Meredith Place, Plant City, Fla. 33566

[22] Filed: Aug. 19, 1974

[21] Appl. No.: 498,555

[52] U.S. Cl. .................... 296/137 B; 296/100; 160/84 R
[51] Int. Cl.² .................................. B60J 7/00
[58] Field of Search ............ 296/100, 10, 105, 109, 296/137 B; 105/377; 160/84 R, 84 V, 84 H

[56] References Cited
UNITED STATES PATENTS

| | | | |
|---|---|---|---|
| 1,689,896 | 10/1928 | Seitz | 296/109 |
| 2,703,140 | 3/1955 | Bonawit | 160/84 R |
| 3,500,895 | 3/1970 | Silvernail | 296/105 |
| 3,740,092 | 6/1973 | Page | 296/105 |
| 3,820,840 | 6/1974 | Forsberg | 296/100 |

FOREIGN PATENTS OR APPLICATIONS

| | | | |
|---|---|---|---|
| 1,163,567 | 12/1956 | France | 160/84 R |
| 300,361 | 11/1928 | United Kingdom | 296/105 |
| 190,804 | 12/1922 | United Kingdom | 296/109 |
| 272,280 | 6/1927 | United Kingdom | 296/109 |

Primary Examiner—Robert J. Spar
Assistant Examiner—Kenneth Noland
Attorney, Agent, or Firm—Duckworth, Hobby, Orman, Allen & Pettis

[57] ABSTRACT

A cover for a truck body of a type including two substantially parallel sides includes two brackets each fixed to one side adjacent the upper edge thereof, each bracket including a substantially flat surface extending normal to the corresponding one of the sides and outward therefrom. A plurality of U-shaped support rods are positioned over the sides and include a roller bearing rotatably supported on the surface such that a cover carried by the rods is movable back and forth across the truck body.

6 Claims, 8 Drawing Figures

TRUCK BODY COVER EMPLOYING ACCESSIBLE ROLLER BRACKET ASSEMBLY

BACKGROUND OF THE INVENTION

1. Field of the Invention

The present invention relates to cover assemblies for truck bodies and the like of the type employing a roller bracket lengthwise along both sides of the body, and in particular relates to such cover assemblies which provide for easy access for cleaning such brackets.

2. Description of the Prior Art

Sand, gravel and similar materials present a serious road hazard if hauled about in open truck bodies. Legislation in many states now requires truck owners and operators to cover such loads so as to prevent spillage. In many cases, these covers are simple tarpaulins which are manually tied down over the open truck body. But the implacement of these manual devices is time consuming and hazardous and is therefore not feasible for commercial trucking operations. It is therefore desirable to employ means for implacing an appropriate cover which the truck operator may quickly and easily utilize, and which may be moved back and forth over the truck body as the uses of the vehicle dictate.

There have been several arrangements suggested in the prior art. Of interest, Richard in U.S. Pat. No. 3,014,104, Greenburg in U.S. Pat. No. 3,310,338 and Reese in U.S. Pat. No. 3,012,813 all teach arrangements in which a flexible cover is folded in an accordian-like manner and thereafter drawn across the truck body. Other arrangements are taught in the following U.S. Pats. Nos.: 3,416,834 to Morse; 3,488,087 to Cox; 3,511,408 to Hughes; 3,498,666 to Harrawood; 3,549,198 to Cappello; 3,138,399 to Hughes; and 3,416,835 to Ohle. Further backgrounds in this area is disclosed in U.S. Pat. No. 2,898,147 to Horner; 2,997,967 to Malbert; 2,967,733 to Amerine; and generally in Patent Office Class 296 subclass 100 among others.

In addition to those teachings described above, a number of patented prior art references teach a roll-up type cover fabricated from sheet metal or plastic. In U.S. Pat. No. 3,472,548, Comisac discloses a slatted arrangement which may be rolled up at the upper forward end of the truck body. A similar arrangement is taught in U.S. Pat. No. 3,774,958 to Thorpe, as well as in U.S. Pat. No. 2,594,910 to Germann. In U.S. Pat. No. 3,298,732 Openshaw discloses a movable canvas truck body cover employing a bracket which is open faced in a direction away from the side of the truck, and L-shaped support rods extending over the open face of the bracket and carrying a canvas cover.

On of the primary difficulties with truck body covers of the types disclosed in all of the above references is that each includes some slatting mechanism for rolling or drawing the cover over the truck body. However, if the slatting mechanism is subjected to blowing sand, gravel and other material, it tends to stick and prevent easy movement of the cover across the truck bed. It is therefore desirable to provide means for allowing easy access to the roller bracket or similar means, such that this bracket can be easily cleaned to avoid the difficulties just described.

SUMMARY OF THE INVENTION

The present invention contemplates a truck body cover which avoids this problem, and constitutes a cover for a truck body of the type including two substantially parallel sides and comprising two brackets, each fixed to one of the sides adjacent the upper edge thereof and including a substantially flat surface extending normal to the corresponding one of the sides and outward therefrom. The cover assembly further includes a plurality of support rods movably positioned over the sides, each rod including a U-shaped bend near one extremity thereof, such that the rod extends outward away from the side and bends back toward the side and the flat surface. A plurality of bearing means, such as rollers or skids, is each coupled to one of the rods at the extremity near the bend and is carried by the flat surface. A cover is positioned between the upper edges of the two sides and is movably supported by the rods.

In use, the U-shaped rod allows easy access to the bearing means support surface, in order that it might be easily cleaned if sand or other material provides an impediment for the movement of the bearing means back and forth across the support surface.

THE DRAWING

FIG. 1 is a perspective view of a truck body cover assembly in accordance with the present invention.

FIG. 2 comprising FIG. 2a, 2b and 2c is a perspective view, partially in cross section of the bracket assembly and bearing means shown in FIG. 1.

DETAILED DESCRIPTION

Figure 1:
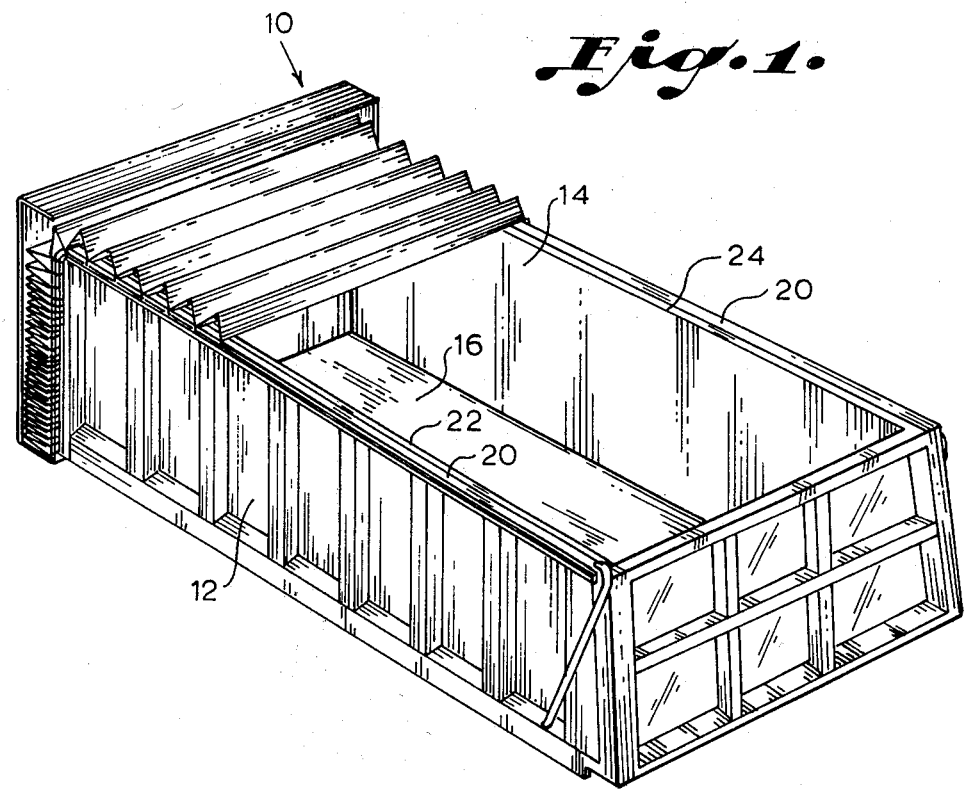
Figure 2A:
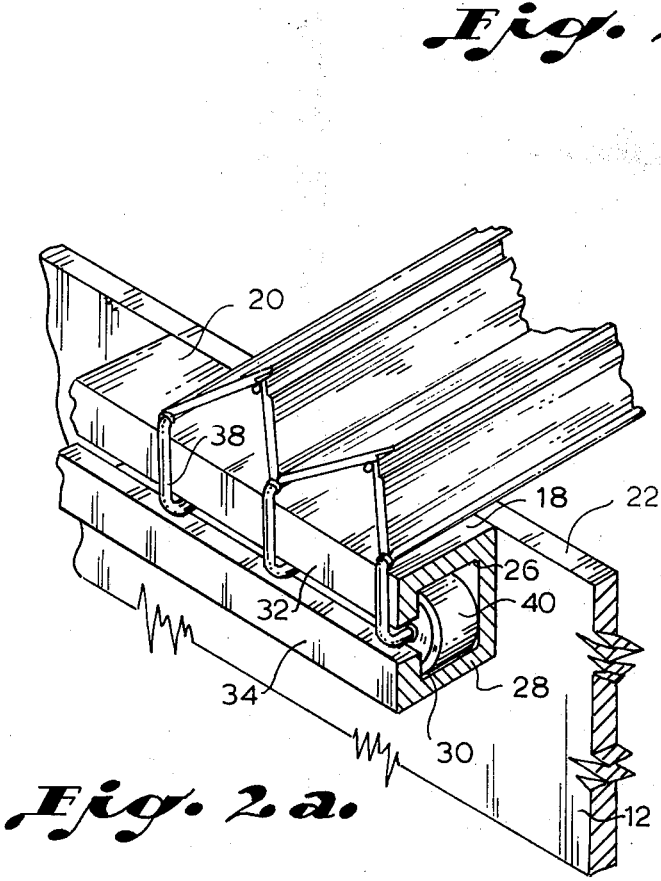
Figure 2B:
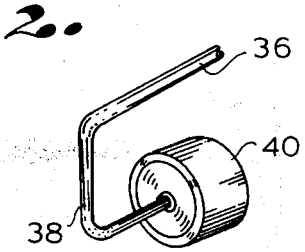

A first embodiment of a truck body cover in accordance with the present invention will be now described with reference to FIGS. 1 and 2.

The truck body, referred to generally as 10, includes two parallel side walls 12 and 14 defining a truck body enclosure 16 used for hauling sand, rock, aggregate and other loose material. A cover assembly in accordance with the present invention includes two brackets 18, 20, each of which is fixed adjacent the upper edge 22, 24 of the respective sides 12, 14. As shown in detail in FIG. 2, each bracket 18, 20 comprises a U-shaped member fixed to the respective side 12, 14 adjacent the upper edge 22, 24 thereof, the two arms 26 and 28 of the U-shaped members 18 and 20 extending substantially perpendicular to the respective side 12, 14, the lower arm 28 having an inner surface 30 which defines a flat support surface. Each of the arms 26, 28 of the U-shaped bracket 18, 20 further includes a depending rim 32, 34, each rim extending perpendicular to the respective arm and inward in a direction toward the other arm.

In accordance with the present invention, there is provided a plurality of support rods 36 movably positioned over the truck body 16 and over and across the upper edges 22, 24 of each side 12, 14. Each support rod 36 includes a U-shaped bend 38 near one extremity thereof, such that that extremity of each rod extends outward away from each side 12, 14 of the truck body 10 and then bends back toward that side and the corresponding U-shaped bracket 18, 20. The cover assembly further includes a plurality of bearing means, for example rollers 40, each of which is rotatably coupled to the one extremity of the support rod 36 near the U-shaped bend 38. As shown in FIG. 2, each of these rollers 40 are supported by the flat surface 30.

Figure 2C:
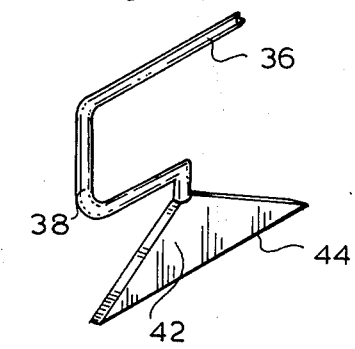
Figure 3:
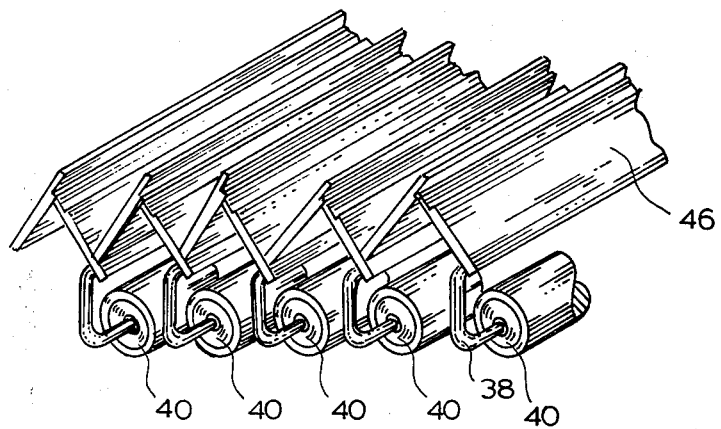
FIG. 3 is a perspective view of the roller bearing and cover assembly of the arrangement of FIG. 1.

A cover is positioned between the upper edges 22, 24 of the truck body sides 12, 14 and is movably supported by the rods 36. In accordance with another aspect of the present invention, this cover comprises a plurality of slats 46, each slat coupled to one of the rods 46 and hinged at each edge to adjacent slats. As will be clearly understood by those skilled in the art, when the rearward most slat 46 is drawn toward the rear of the truck, the rollers 40 are carried along the flat surface 30, and the slats are then made to lie flat and thereby cover the enclosure 16. An alternate bearing means is shown in FIG. 2c and comprises a skid 42 having a leading edge 44 adapted to clear the flat surface 30 as the cover is moved back and forth over the enclosure 16.

Figure 6:
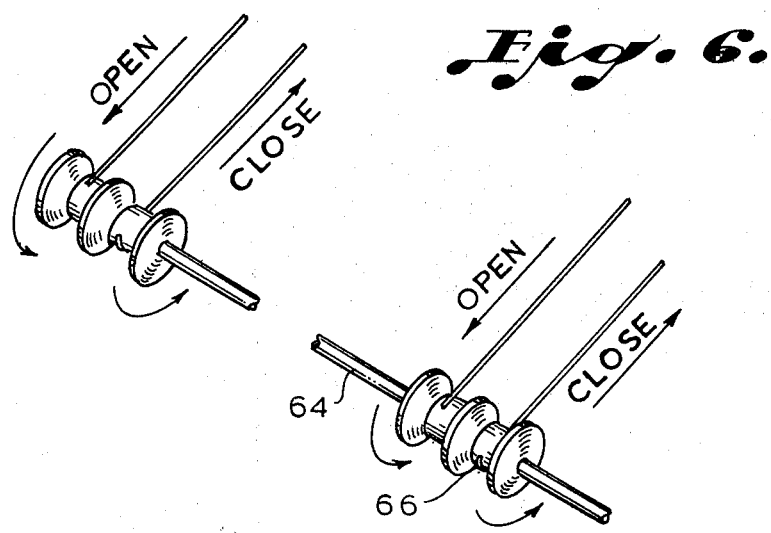
FIG. 6 is a perspective view of a portion of the apparatus shown in FIG. 5.
Figure 5:
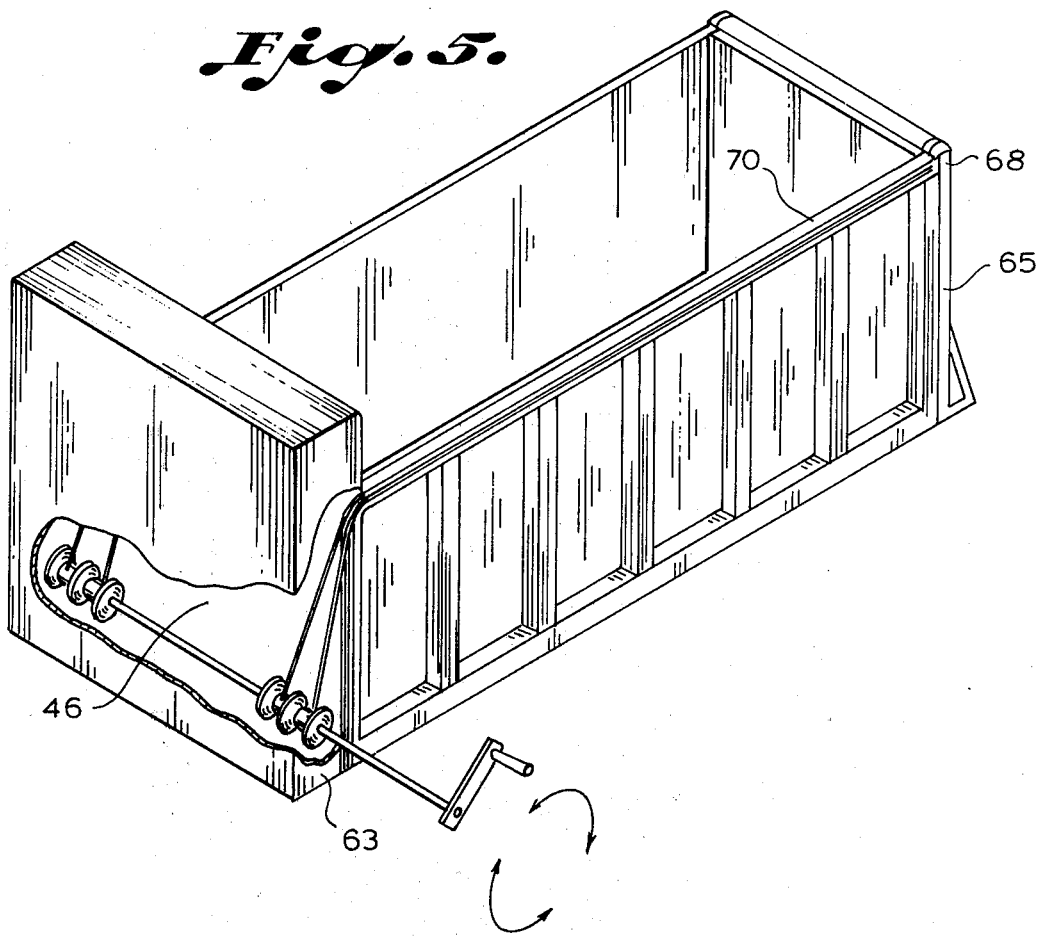
FIG. 5 is a front perspective view of the apparatus of FIG. 1.

Reference is now made to FIGS. 5 and 6. In accordance with yet another aspect of the present invention, there is provided an enclosure 62 at the forward end 63 of the truck body 10. Means are also provided for drawing the slats 46 into the enclosure 62, and folding the slats 46 one on another. In this embodiment, such drawing means comprises a shaft 64 extending through the enclosure 62 crosswise with respect to the truck body 10. Pulleys 66 are fixed to the shaft 64, and a second pulley is positioned at the rear 65 to the truck body 10. An endless cable 70 loops the first and second pulleys and is coupled to at least the rearward extreme slat 46, so as to allow the cover to be drawn into and out of the enclosure 62 responsive to the rotation of the pulley 66 and 68 responsive to rotation of the shaft 64. The shaft 64 may be rotated manually, or alternatively a variety of driving mechanisms may be provided.

Figure 4:
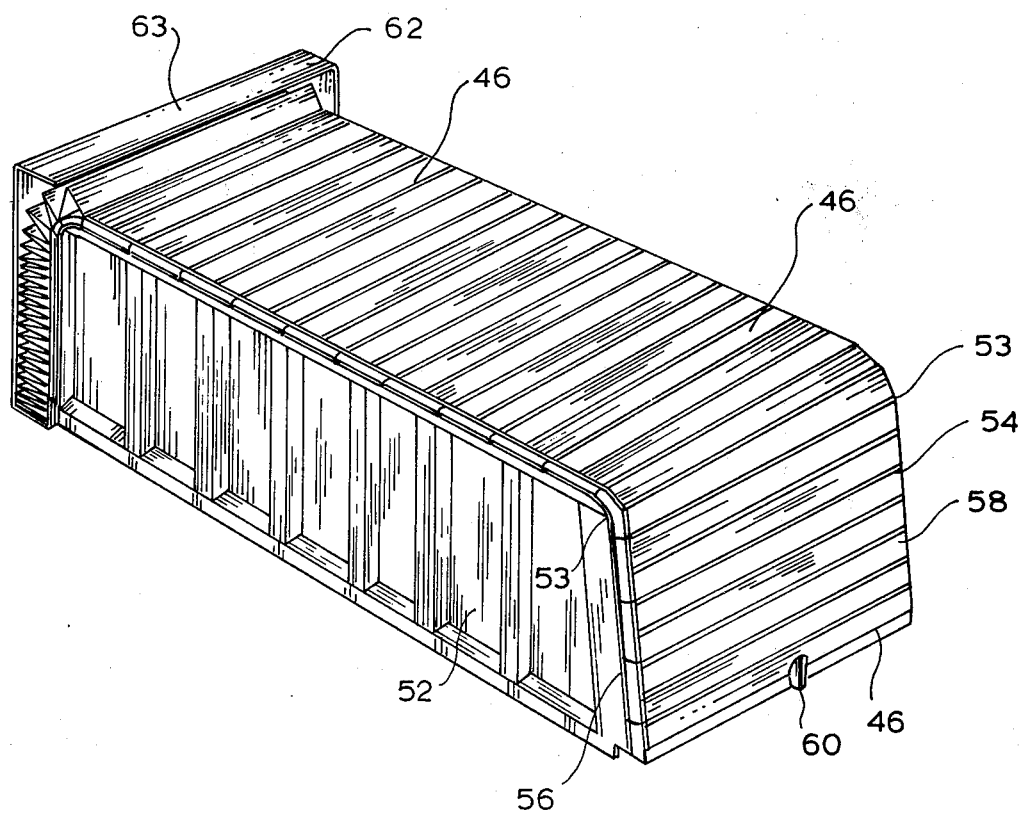
FIG. 4 is a top perspective view of another embodiment in accordance with the present invention.

An alternate embodiment of the truck body cover in accordance with the present invention is shown in FIG. 4 and referred to generally as 50. In this embodiment, the sides 52, 54 of the truck body 50 are provided with a slope 53 at the rear extremity thereof, and the U-shaped brackets 56 and 58 corresponding to the brackets 18 and 20 of FIG. 1 are likewise provided with a slope such that the slats 46 may be drawn to the lower rear edge of the truck body 50. A spring loaded fastener 60 or equivalent hardware is provided to latch the rearward slat 46.

A variety of other modifications and arrangements may likewise be employed with the above described truck body cover without departing from the spirit and scope of the present invention. For example, canvas or a similar flexible material may be employed in lieu of the slats described above. Further, it will be understood that other varying support forms may be employed in place of the U-shaped bracket described above; for example, an L-shaped bracket might be employed.

The cover assembly of the present invention allows easy access to the bearing surface 30, which in turn allows this surface to be quickly and easily cleaned in the event that the material being shipped or road or grit material prevent easy movement of the cover.

We claim:

1. A cover for a truck body of the type including two substantially parallel sides, said cover comprising:
   two brackets, each fixed to one of said sides adjacent the upper edge thereof, each said bracket including a substantially flat surface extending normal to the corresponding one of said sides and outward therefrom;
   a plurality of support rods movably positioned over said sides, each said rod including a U-shaped bend near each extremity thereof, such that said bend extends outward away from said side and bends back towards said side and then towards said surface;
   a plurality of bearing means, each coupled to one of said rods at the extremity near said bend, said bearing means carried by said flat surface;
   a cover positioned between the upper edge of said two sides and movably supported by said rods, with said cover comprising a plurality of slats, each slat coupled to hinges and said rods are attached to said hinges at the corresponding one of said bends;
   an enclosure at the forward end of said truck body; and
   means for drawing said slats into said enclosure and folding said slats on one another.

2. The apparatus recited in claim 1 wherein each said bearing means comprises a roller rotatably joined to said rod extremity.

3. The apparatus recited in claim 1 wherein each said bearing means comprises a skid fixed to said rod extremity, said skid including a leading edge adapted to clear said surface when moved therealong.

4. The apparatus recited in claim 1 wherein each said bracket further comprises:
   a substantially U-shaped member fixed to said side adjacent the upper edge thereof, the two arms of said U-shaped member extending normal to said side, the lower of said two arms having an inner surface which defines said flat surface;
   two depending rims, each extending perpendicular to one of said arms and inwardly in a direction toward the other arm; and wherein
   said rods extend between said rims.

5. The apparatus recited in claim 4 wherein said sides define a slope at the rear of said truck body, said U-shaped bracket extending along said slope to the bottom of said body.

6. The apparatus recited in claim 1 wherein said drawing means comprises:
   a shaft extending through said enclosure crosswise with respect to said truck body;
   a first pulley fixed to said shaft;
   a second pulley positioned at the rear of said truck body; and
   means looping said first and second pulleys and coupled to said cover for drawing said cover into and out of said enclosure.

* * * * *